United States Patent [19]

Stolpman

[11] Patent Number: 4,599,617

[45] Date of Patent: Jul. 8, 1986

[54] METHOD AND APPARATUS FOR EVALUATING THE RANGE DATA ACCUMULATED BY DISTANCE MEASURING EQUIPMENT

[75] Inventor: James L. Stolpman, Johnson County, Kans.

[73] Assignee: King Radio Corporations, Olathe, Kans.

[21] Appl. No.: 653,676

[22] Filed: Sep. 21, 1984

Related U.S. Application Data

[63] Continuation of Ser. No. 275,443, Jun. 19, 1981.

[51] Int. Cl.[4] .............................................. G01S 13/76
[52] U.S. Cl. .................... 343/7.3; 343/5 DP; 364/451
[58] Field of Search .............. 343/7.3, 12 R, 13 R, 343/5 DP; 364/451

[56] References Cited

U.S. PATENT DOCUMENTS

| | | | |
|---|---|---|---|
| 3,246,324 | 4/1966 | Price | 343/7.3 |
| 3,412,400 | 11/1968 | Aker | 343/7.3 |
| 3,456,257 | 7/1969 | Aker | 343/7.3 |
| 3,533,060 | 10/1970 | Aker | 343/7.3 X |
| 3,539,978 | 11/1970 | Stedtnitz | 343/13 R X |
| 3,702,475 | 11/1972 | Alden et al. | 343/7.3 |
| 3,781,888 | 12/1973 | Bail | 343/7.3 X |
| 3,900,848 | 8/1975 | Mears | 343/7.3 |
| 3,962,703 | 6/1976 | Collot et al. | 343/7.3 |
| 3,983,557 | 9/1976 | Powell et al. | 343/7.3 |
| 4,028,698 | 6/1977 | Miller et al. | 343/7.3 X |

Primary Examiner—T. H. Tubbesing
Assistant Examiner—Gilberto Barrón, Jr.
Attorney, Agent, or Firm—Kokjer, Kircher, Bradley, Wharton, Bowman & Johnson

[57] ABSTRACT

This invention discloses a DME which employs an improved technique for validating received replies. The technique employed reduces lock-on time by analyzing all of the range data received within a set time period following the transmission of an interrogation pulse pair rather than just one range figure for each interrogation cycle. The DME also provides improved accuracy and reliability by varying the width of the range gate used in analyzing the received range data in accordance with the time difference between the two interrogation cycles from which range data is being compared with system status, i.e., whether the system is in the locked position or not.

17 Claims, 12 Drawing Figures

4,599,617

METHOD AND APPARATUS FOR EVALUATING THE RANGE DATA ACCUMULATED BY DISTANCE MEASURING EQUIPMENT

This is a continuation of application Ser. No. 275,443, filed June 19, 1981.

BACKGROUND OF THE INVENTION

This invention relates in general to an improved DME and more particularly to a microprocessor implemented DME that employs a unique method for accumulating and analyzing range data.

A DME calculates slant range distance by measuring the time interval between transmission of a radio signal to a preselected VOR/DME station (hereinafter referred to as a ground station transponder) and reception of a reply signal. Distance may then be indicated in nautical miles on a range/speed/time to station indicator.

In DME systems, the transmitter mounted on the aircraft sends out very short interrogation pulse pairs at irregular intervals. These interrogation pulses are in turn picked up by the receiver of the ground station transponder. Upon receipt of such an interrogation pulse pair, the transmitter of the ground station transponder sends out a pair of reply pulses on a different channel. These reply pulses are received by the airborne receiver which measures the round-trip travel time (time interval between transmission of an interrogation pulse pair and receipt of a reply pulse pair) and converts this measurement into range information.

In system operation, the given ground station transponder will be constantly interrogated by a number of aircraft which are within range and tuned to its channel. The ground station transponder replies to all these interrogations and each aircraft receives the sum total of replies to all of the aircraft. In order to prevent false lock-on under normal operating conditions, it is arranged that each aircraft transmit an interrogation pulse pair that occurs at a rate that is intentionally permitted to "jitter" or vary (within certain limits) in an irregular manner.

The typical DME has two modes of operation, the search mode and the track mode. In the search mode of operation, the DME progressively scans each of the reply pulses to determine which of the received reply pulses are in fact responses to the aircraft's own interrogation pulses. The search operating principal is to locate valid reply pulses by finding the one fixed time interval delay (measured from the DME's own previous interrogation pulse pair) during which a pair of reply pulses is repeatedly received. Since the interrogation pulses from other aircraft are nonsynchronous and random with respect to a given aircraft's interrogation pulses, reply pulses corresponding to such foreign interrogations will not be received by a given aircraft at a regular or slowly changing time delay. Once the DME is locked onto the valid reply pulses, the DME enters the track mode of operation wherein the time delay is converted into range information which is thereafter used to track the progress of the aircraft and keep the DME locked onto the ground station transponder.

Since each DME receives all of the replies produced by a given ground station transponder, the DME must be able to sort through all of the replies and determine which of them are valid, i.e., responses to its interrogation pulse pairs. Conventional DME systems typically employ a second order range data tracking method to detect and filter valid replies. This technique entails the starting of a range counter upon transmission of an interrogation pulse pair and a stopping of the range counter if a reply pulse is received within a set time period or range gate. If a reply pulse is received within the range gate, it is considered to be a valid reply and range data corresponding to this reply is provided to a tracking filter or is used to generate an output which is representative of the distance between the aircraft and the ground station transponder.

A range gate is a time period which is centered on the previous range output of the tracking filter if the DME unit is presently locked onto a ground station transponder. If the DME is not locked onto a ground station transponder, the DME searches for valid replies by initiating a first interrogation and allowing a first reply received following transmission of this interrogation to stop the range counter to provide a range figure which is retained for future reference. This range figure is typically represented by the count state of the range counter upon receipt of the reply pulse. During the next several interrogations, the DME constructs a range gate about this range figure and searches for the receipt of a reply within the range gate. The range gate remains at this position unitl there are a preselected number of excessive interrogations without the receipt of a reply within the range gate. Once this condition occurs, another interrogation is initiated and the range gate is moved to the range figure represented by the first reply following the present range figure. This process continues until the range gate reaches the maximum range figure causing the unit to restart the search process or until a preselected number of valid replies are received before the preselected number of successive interrogations without the receipt of a reply within the range gate. The receipt of a preselected number of replies before the occurrence of a preselected number of successive interrogations without the receipt of reply within the corresponding range gate causes the unit to enter the locked or track mode of operation. In this way, these prior art DME systems search for replies that are not just noise or squitter pulses by searching through and validating each range figure individually.

The above described searching process has a number of inherent disadvantages. One of the most significant drawbacks of this process is that there is no way to determine if the bit is locked onto an echo of the actual reply rather than the actual reply without the use of additional circuitry to monitor the presence of such echos. Another disadvantage of these prior art systems is that only one reply pulse can be evaluated following each interrogation thereby requiring a large number of interrogations to properly lock onto the ground station transponder. Accordingly, these prior art DMEs tend to be rather slow in operation requiring from one to two seconds to lock onto a designated ground station transponder with a high degree of probability. Another disadvantage associated with convention DME units is that the width of the range gate remains constant at all times. In these units, the width of the range gate is determined by a large number of factors including: (1) the interrogation rates; (2) the maximum velocity the unit is designed to track; and (3) the gain constants of the second order filter used in the tracking filter to smooth the range data. To accomodate these factors, the range gate in these prior art DMEs is usually made fairly large. As a result, the probability of an invalid pulse occurring within a range gate is greatly increased, thereby reducing the accuracy of these prior art DME units.

SUMMARY OF THE INVENTION

The present invention comprises an improved DME which implements a new and unique digital ranging technique that provides improved immunity to noise and a decreased lock on time. The ranging technique of the present invention comprises the steps of accumulating and storing the range figure corresponding to each reply received within a set time period after transmission of an interrogation pulse pair, comparing the range data from the latest interrogation with range data from a preselected number of prior interrogations to determine which range figures from these interrogations are synchronous (i.e., represent time intervals which are within a set period of time or range gate of each other), statistically examining the synchronous range figures to determine which of the synchronous range figures correspond to valid replies and using the range figures corresponding to valid replies to develop a distance output. In this way, the DME of the present invention is capable of processing all of the range figures obtained after interrogation rather than just processing one range figure for each interrogation. This processing technique is effective to greatly reduce the number of interrogations and time needed to lock onto a designated transponder. The accuracy and noise immunity of the subject DME is further enhanced by using a range gate with a variable width. In particular, the width of the range gate is dependent upon the time difference between the two interrogations from which range data is being compared and the current status of the system (whether the unit is presently locked onto a designated ground station transponder or not).

It is therefore an object of the present invention to provide an improved DME which is capable of significantly reducing the number of interrogations and time needed to lock on to an associated transponder.

A further object of the present invention is to provide an improved DME which accumulates and evaluates all of the range figures obtained following an interrogation rather than just a single range figure for each interrogation.

An additional object of the present invention is to provide an improved DME with enhanced noise immunity through the use of a range gate having a variable width.

It is a further object of the present invention to provide an improved DME which is capable of locating the lowest range figure without the need for additional echo monitoring circuitry or software.

It is a further object of the present invention to provide an improved DME which is capable of being microprocessor implemented.

Other and further objects of the invention, together with the features of novelty appurtenant thereto will appear in the course of the following description.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
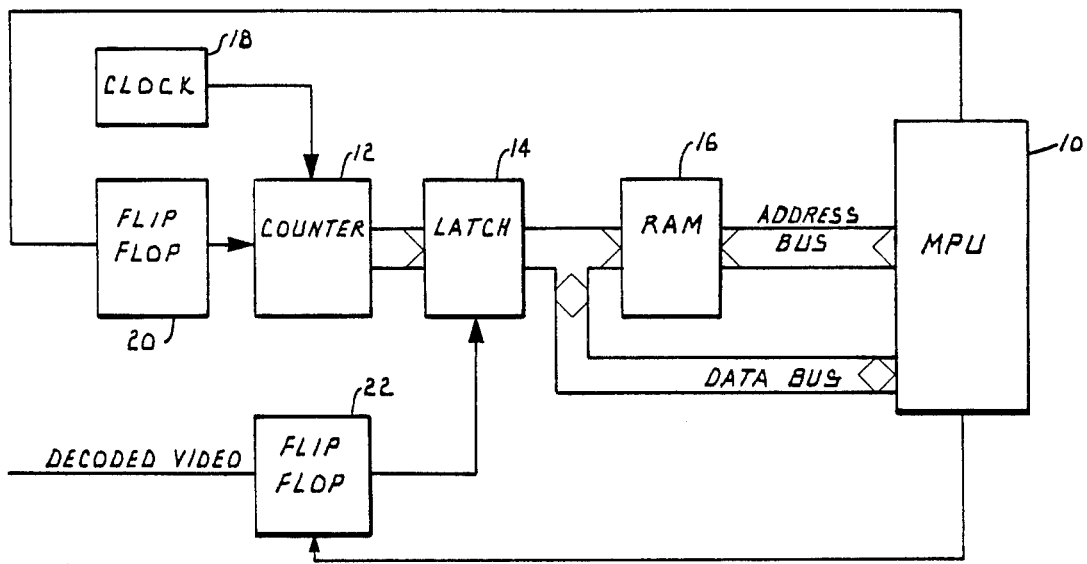
FIG. 1 is a block diagram of the main components included in a DME constructed in accordance with a preferred embodiment of the present invention.

Reference is now made to FIG. 1 wherein the operable components of a DME which is constructed in accordance with the preferred embodiment of the subject invention are shown in block form. As shown in this figure, the DME of the subject invention is comprised of a microprocessing unit 10, a range counter 12, a latch circuit 14, a random access memory 16, a clock 18 and pair of flip flops 20 and 22.

The DME of the subject invention is arranged to continuously cause a pair of interrogation pulses to be transmitted to a ground station transponder at irregular intervals. Following the transmission of such a pulse pair, the unit searches for reply pulses having an appropriate spacing and records range data corresponding to each such pair of reply pulses which occur within a set time interval following the transmission of the interrogation pulse pair. Once a suitable amount of range data has been accumulated (usually three interrogations), the DME correlates the data, statistically examines the correlated data to determine if it is valid, and generates a distance output using the validated data.

Upon transmission of a pair of interrogation pulses by the DME, microprocessor 10 generates a trigger signal which causes flip flop 20 to be placed in a set condition. Setting of flip flop 20 in turn causes the range counter 12 to be enabled and to remain enabled until the counter reaches its maximum count state. Thereafter, receipt of a pair of reply pulses exhibiting the appropriate spacing causes flip flop 22 to be placed in a set condition. The placement of flip flop 22 in a set condition in turn causes two things to occur. First, the current count state of range counter 12 is latched into latch 14. A count state thus stored in latch 14 is representative of the elapsed time between transmission of the interrogation pulse pair and receipt of the reply pulses. In a DME, the elapsed time represented by the count state of the range counter can be converted into a distance figure which is representative of the distance between the aircraft and an associated transponder. A second action resulting from the placement of flip flop 22 in a set condition is the transmission of a data stored signal to the microprocessor 10. The transmission of such a signal to the microprocessor 10 indicates to the microprocessor that there is data in the latch which needs to be stored. Accordingly, microprocessor 10 responds to the receipt of such a signal by executing an instruction that stores the data directly from latch 14 into RAM 16. In this way, range data associated with this first pair of reply pulses is stored in ram 16 for future reference. Following execution of this instruction, microprocessor 10 causes flip flop 22 to return to a reset condition thereby enabling it to be placed into a set condition upon receipt of the next pair of reply pulses exhibiting the required spacing. Upon receipt of the next pair of reply pulses exhibiting the required spacing, flip flop 22 is once again placed in a set condition and causes the range figure corresponding to the second pair of reply pulses to be stored in RAM 16 in the manner described above. This process is repeated until range counter 12 reaches its maximum count state. Once the counter reaches its maximum count state, flip flop 20 is reset causing range counter 12 to be disabled and reset.

When a new channel is tuned (i.e., the DME is tuned to lock onto a new transponder), microprocessor 10 initiates three interrogations before the accumulated range data is analyzed to determine if it is valid. If, on the other hand, the DME is locked onto the designated transponder, the range data of the latest interrogation is immediately analyzed. The analysis of the data entails comparing the range data from the latest interrogation with range data from the previous seven interrogations to determine if any of the accumulated range figures are synchronous, i.e., fall within a designated period of time (hereinafter referred to as a range gate) following transmission of the pair of interrogation pulses. In particular, the comparison is accomplished by serially comparing each range figure resulting from the latest interrogation with each of the range figures produced during the previous seven interrogations to determine if the time period or ranges represented by the two range figures are within a designated value (range gate) of each other. This is the equivalent of saying that the two figures fall within a designated period of time or range gate following transmission of the pair of interrogation pulses. By starting with the smallest range figure of the latest interrogation and serially working outward to the largest range figure, the analysis will always find the synchronous replies with the lowest range, thereby eliminating the need for a separate and distinct echo monitor or software program. Since this comparison of the accumulated data uses no prior range data as a base except data from the latest interrogation, it is an independent non-recurring process that has a range output that is independent of all previous outputs of the process.

In making this comparison, two range figures are thought to be synchronous if:

$$X_{OG} - X_{NK} < RG$$

where $X_{OJ}$ is the J range figure of the latest interrogation, $X_{NK}$ is the K range figure of the Nth previous interrogation (N can vary from one to seven) and RG is the present width of the range gate. Unlike the range gate employed in prior art DMEs, the width of the range gate used in the subject DME is dependent upon the time difference between the two interrogations from which range data are being compared and the current status of the system. In particular, the width of the range gate is defined by the equation:

$$RG = Y_M T_M$$

where $T_M$ is the variable time component of the range gate value and $Y_M$ is the variable status component of the range gate value. The time component ($T_M$) of the range gate figure for correlation calculations to the Nth previous interrogation is in turn defined by the equation:

$$T_M = \sum_{i=1}^{N} t_i$$

$t_i$ represents the time between n and n−1 interrogations. In this way, the width of the range gate is varied in accordance with which of the previous interrogations the range figure of the latest interrogation is being compared.

The variable status component ($Y_M$) of the range gate equation is defined by the equation:

$$Y_M = Y_{M-1} + L(\Delta X)$$

where $Y_{M-1}$ is a figure representative of the width gate used in the previous comparison, $\Delta X$ is a small increment of the range gate (e.g., five microseconds) and L is a constant which controls incrementing and decrementing the range gate in accordance with the status of the system. In particular, L is equal to −1 when a system is in lock and to +1 when the system is unlocked or zero if the range gate is at its acceptable minimum value (B) and is to be decremented or at its maximum limit (C) and is to be incremented (B less than or equal to $Y_M$ less than or equal to C). In this way, the range gate in incrementally decreased to a minimum limit once the system becomes locked onto a designated ground station transponder. Upon obtaining its minimum light, the range gate remains at this width until the system becomes unlocked. Upon loss of lock, the range gate is made larger by an incremental value to facilitate the lock function.

Figure 2:
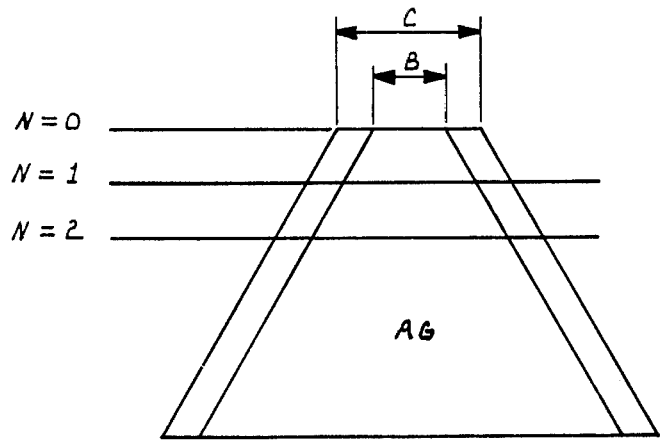
FIG. 2 is a graphic illustration of the variation in the range gate of the DME.
Figure 3G:
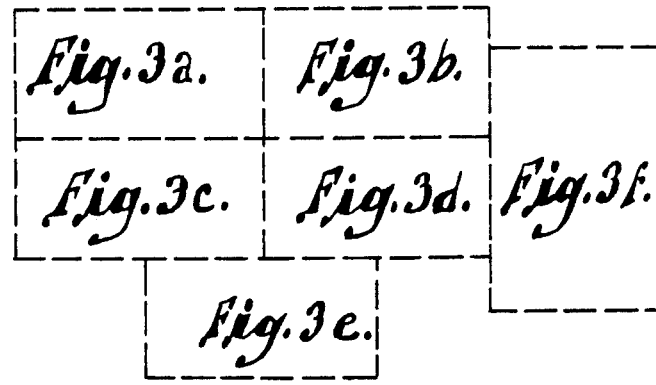
FIG. 3g is an organizational diagram indicating the organization of FIGS. 3a–3f.
Figure 3A:
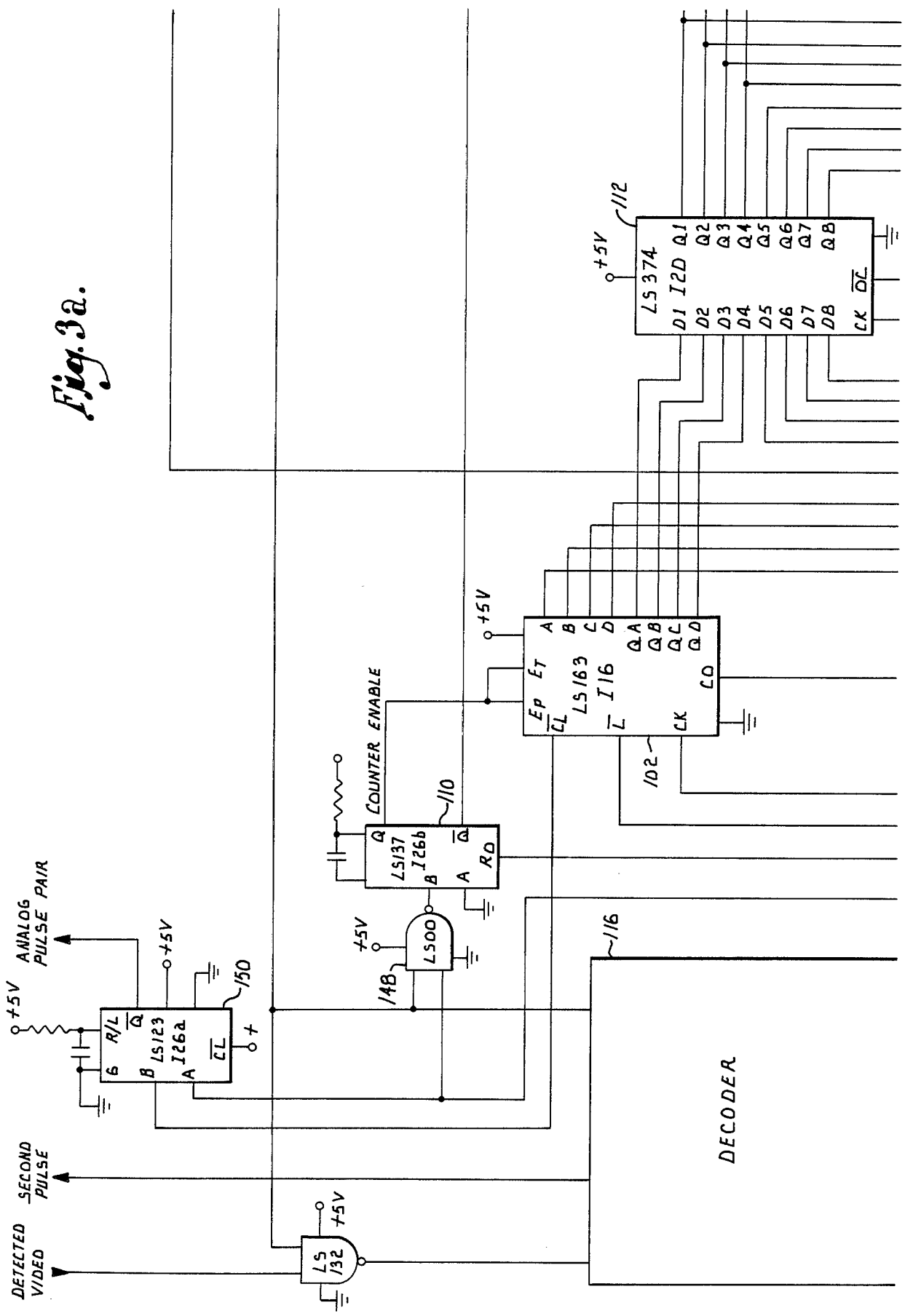
FIGS. 3a–3f together provide a schematic diagram of the circuitry of the DME.
Figure 3B:
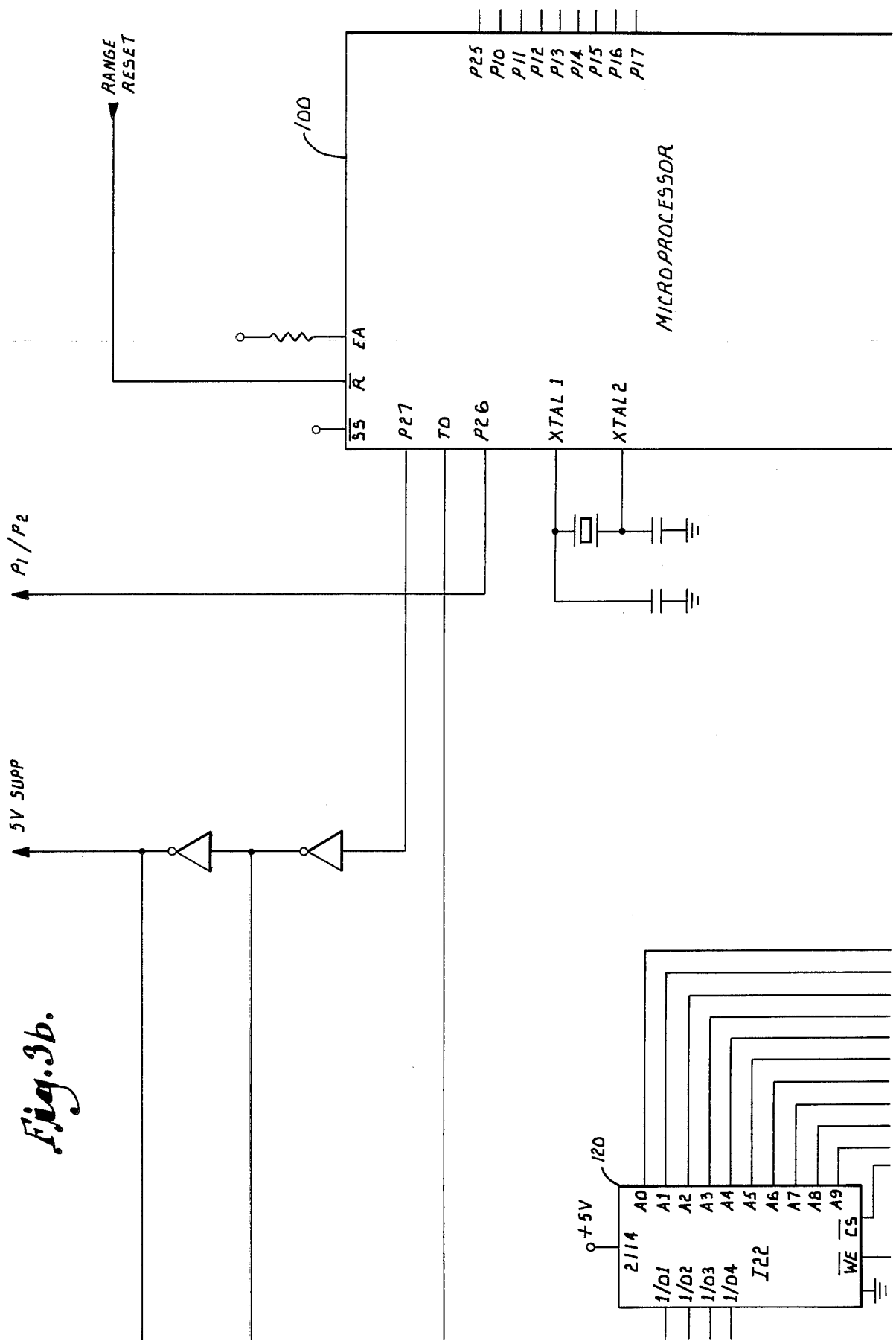
Figure 3C:
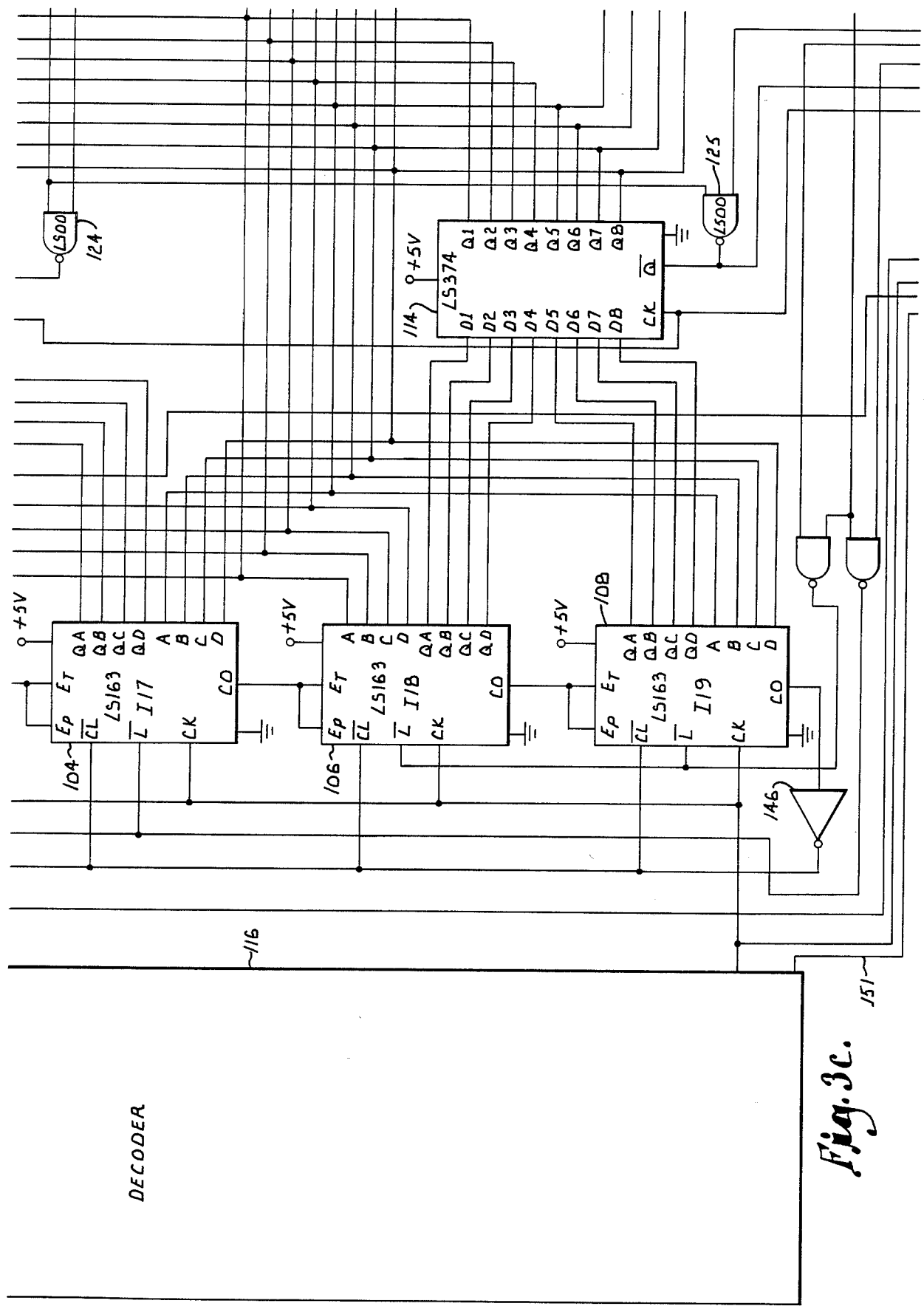
Figure 3D:
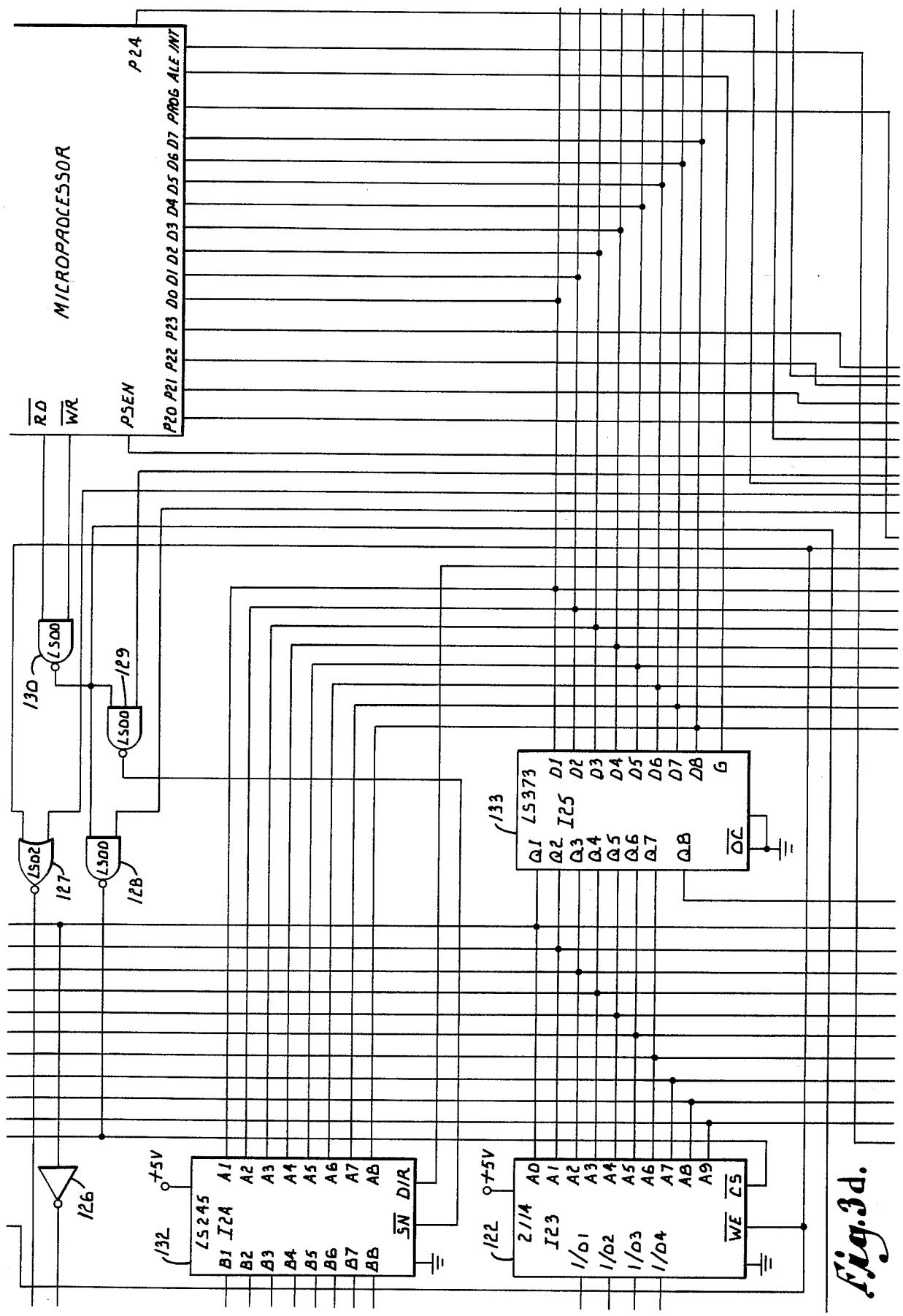
Figure 3E:
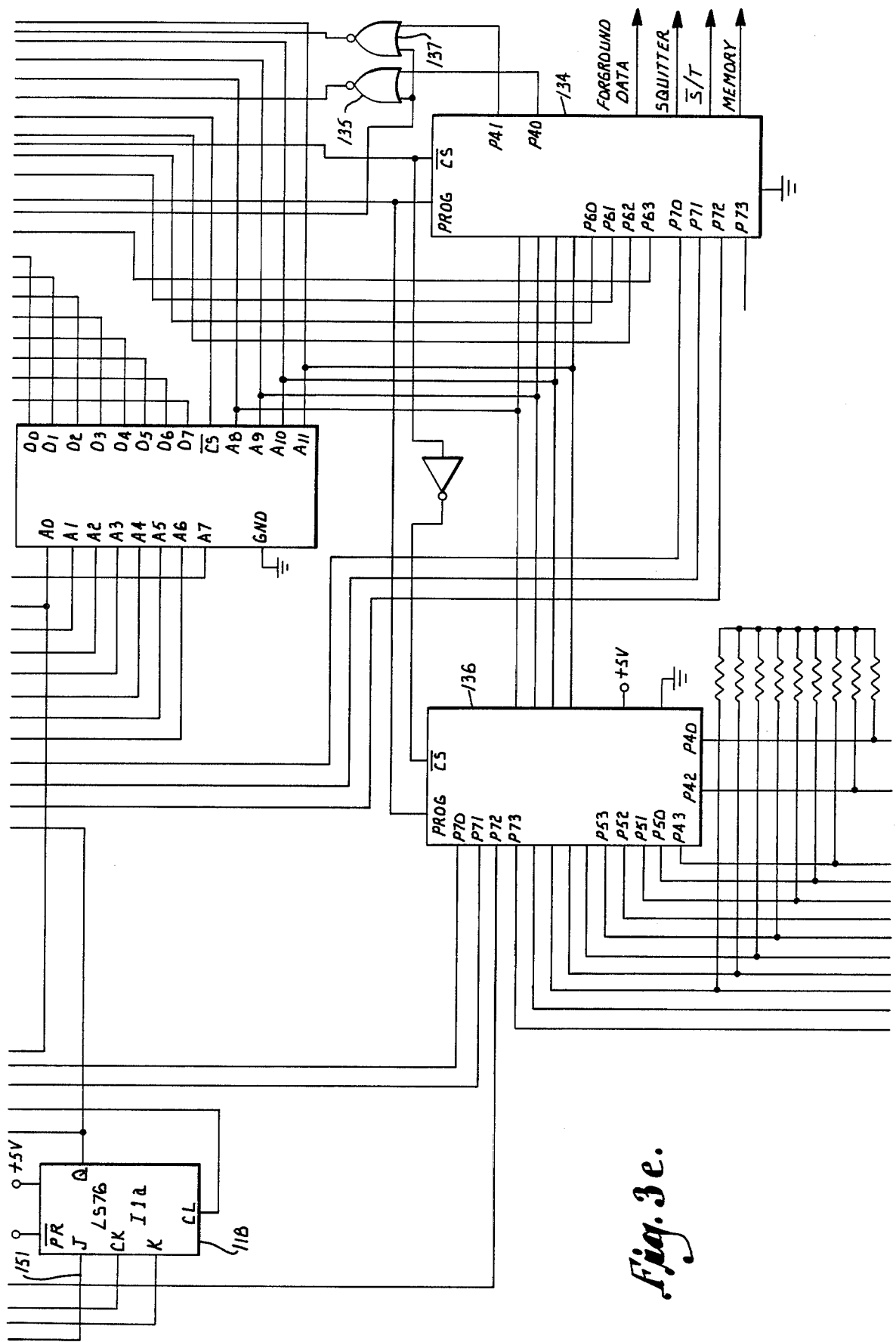
Figure 3F:
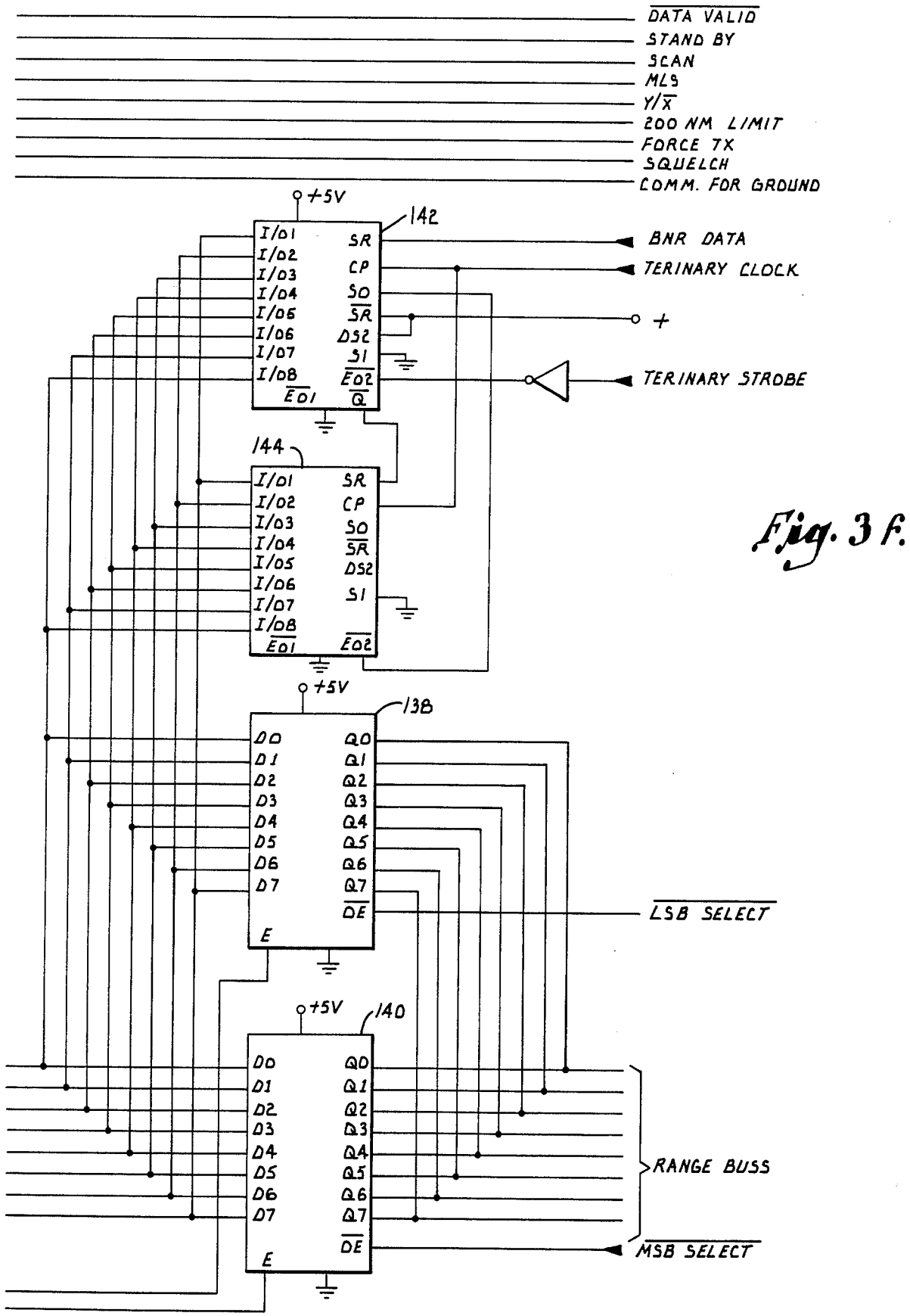

When a new channel is tuned, the status component or the range gate is set to its maximum value and range data for a plurality of interrogations is accumulated. Once a sufficient amount of range data has been accumulated, the data is correlated to determine which of the range figures are synchronous. As described above, this correlation process is accomplished by comparing each range figure of the latest interrogation against each range figure of the previous seven interrogations. In making this initial comparison of the accumulated range figures, the system is not in lock so that the status component $Y_M$ of the range gate remains at its maximum value. The time component $T_M$, on the other hand, is varied depending upon which interrogation the range data of the latest interrogation is being compared against. This variation in the range gate during the correlation process is graphically illustrated in FIG. 2.

Once the three range figures are found to be synchronous, these range figures are statistically examined to determine if they represent valid replies. In performing this analysis, it is assumed that the aircraft is moving at a constant velocity. This assumption is valid because of the relationship of the rate at which the ground station transponder is interrogated to the physical limits on the acceleration of the aircraft. This statistical analysis of the synchronous range figure is performed by using two of the range figures to calculate the velocity of the aircraft. If $X_{SO}$ is the synchronous range figure for the latest interrogation and $X_{SN}$ is the synchronous range figure for the Nth pervious interrogation then the velocity of the aircraft can be calculated by using the equation:

$$V = (X_{SO} - X_{SN})/N_{ti}$$

where V is equal to velocity and $t_i$ is the time between interrogations. The velocity figure calculated using these two range figures can then be used to calculate a third range figure. By comparing the calculated range figure with the measured range figure on a corresponding interrogation, the efficiency of the accumulated range figures can be ascertained to determine if the system is locked onto the appropriate ground station transponder.

The range figure of a synchronous reply falling between two other synchronous replies can be calculated according to the equation:

$$X_{CN} = X_{SO} + ([X_{SM} - X_{SO}]/M)N$$

where $X_{CN}$ is the calculated range figure of the Nth previous interrogation, $X_{SO}$ is the synchronous range figure from the latest interrogation, and $X_{SM}$ is the synchronous range figure from the earliest (Mth) previous interrogation for which a synchronous range figure exists. The deviation between the calculated range figure of the Nth interrogation and the measured range figure of the Nth interrogation can be determined by taking the absolute value of the difference between these two range figures. The total deviation for all of the synchronous range figures is simply the sum of the deviations for each of the range figures between the most recent and the oldest synchronous range figures.

For example, one deviation can be calculated from three range figures, two deviations can be calculated from four range figures and so on. From the use of statistical data, it is possible to obtain a deviation for a noise or squitter lock for any number of replies. By comparing the actual deviation with the statistical deviation, it is possible to determine if the synchronous range figures are sufficient to indicate system lock. In the normal sequence of events, a deviation is computed as soon as three synchronous range figures are obtained. This deviation is then compared with the statistical deviation corresponding to three replies. If the computed deviation is less than the statistical deviation, the data is considered to be sufficient and the system is placed in a locked condition. If this condition is not met, however, the new deviation is computed upon receipt of the next synchronous range figure. This deviation is then compared with the statistical deviation corresponding to four replies. If the computed deviation is less than the statistical deviation, the system enters a locked condition. If the system thereafter becomes unlocked from the ground station transponder, a similar type of statistical analysis is performed on all of the synchronous range figures thereafter produced in an attempt to reenter a locked condition.

Once the unit becomes locked onto the designated ground station transponder, the validated range figures are used by a tracking filter to develop a distance output. The initial distance output from the tracking filter is simply a transfer of the synchronous range figures. Following this initial development of a distance output, the next synchronous range figure is checked before it is used to update the distance output. In particular, the range figure from the latest interrogation is compared against the distance output from the tracking filter to determine if the difference between these two figures is less than a preselected constant. If this condition is met, the output of the tracking filter and the range figure from the latest interrogation are used to calculate the next output of the tracking filter. This calculation is defined by the equation:

$$X_{F+1} = X_F + K_1(X_F - X_{SO}) + K_2 T \sum_{n=0}^{t} (X_F - X_{SO})_n$$

where $X_{F+1}$ is representative of the next output of the tracking filter, $X_F$ is the present output of the tracking filter, $X_{SO}$ is the range figure from the latest interrogation, T is the between successive outputs of the tracking filter, and $K_1$, $K_2$ are constants.

Another feature of the subject invention is that the width of the range gate is constantly reduced to a minimum value once the unit enters the locked condition. If the locked condition is thereafter lost, the status component $Y_M$ of the range gate will increase in an attempt to relocate synchronous replies. By this method, the status component of the range gate has a minimum value that allows a system lock and will reduce the number of erroneous replies that would otherwise be considered synchronous.

Reference is now made to FIGS. 3a-3f for a more detailed description of the subject invention. As shown in these figures, the DME of the subject invention employs a microporocessor 100 to control the operation of the unit. Microprocessor 100 corresponds to microprocessor 10 of FIG. 1. The DME is also comprised of a plurality of counters 102, 104, 106 and 108 which are interconnected to form the range counter corresponding to range counter 12 of FIG. 1. The operation of the counters 102, 104, 106 and 108 is controlled by microprocessor 100 through a flip flop 110 which corresponds to flip flop 20 of FIG. 1.

The DME also includes a pair of latches 112 and 114 which are operable to temporarily store a range figure represented by the present count state of the range counter comprised of counters 102, 104, 106 and 108 upon receipt of a decoded video pulse from a decoder 116. These two latches cooperate to form latch 14 of FIG. 1. Decoder 116 is of conventional design which is well known to those of ordinary skill in the art and, as a result, is only shown in block form. Decoder 116 includes a crystal oscillator of conventional design which provides the clock for counters 102, 104, 106 and 108 and which corresponds to clock 18 of FIG. 1. A flip flop 118 is provided to control the transfer of range data from the range counter comprised of counters 102, 104, 106 and 108 to latches 112 and 114 upon receipt of a decoded video pulse from decoder 116. Flip flop 118 corresponds to flip flop 22 of FIG. 1. Permanent storage of the range data is performed by a pair of random access memories 120 and 122 which correspond to ram 16 of FIG. 1. The transfer of range data between latches 112 and 114 and RAMS 120 and 122 is controlled by microprocessor 100 through a plurality of latch gates 124, 125, 126, 127, 128, 129 and 130.

The transfer of data between microprocessor 100 and RAMS 120 and 122 is regulated by a bi-directional port circuit 132 which operates in combination with a latch circuit 133 and a pair of port expanders 134 and 136 in a manner which is well known to those of ordinary skill in the art. The DME is also equipped with a pair of latches 138 and 140 which cooperate with port expander 134 and logic gates 135 and 137 to output data from microprocessor 100.

The DME is also equipped with a pair of shift registers 142 and 144 which are part of a self-test circuit. Another feature of the DME shown herein is that it is capable of producing an analog pulse pair to be used by external circuitry. This analog pulse pair is produced by microprocessor 100 in combination with port expander 136, the range counter comprised of counters 102, 104, 106 and 108, flip flop 110, inverter 146, logic gate 148 and flip flop 150.

In operation, microprocessor 100 is operable to continuously initiate the transmission of interrogation pulse pairs at irregular intervals. The time period between transmission of interrogation pulse pairs is referred to as an interrogation cycle. The interrogation pulse pairs which are transmitted by the DME are framed by a suppression pulse in a manner which is well known to those of ordinary skill in the art. This suppression pulse is produced at the P27 output of microprocessor 100. The presence of a suppression pulse at this output causes flip flop 110 to be set which in turn causes the range counter comprised of counters 102, 104, 106 and 108 to be enabled. Following the transmission of an interrogation pulse pair, decoder 116 searches for reply pulses exhibiting the appropriate spacing. Upon receipt of such a pair of reply pulses, the decoder 116 produces a decoded video pulse on line 151 which causes flip flop 118 to be placed in a set condition thereby producing a data presence signal at the Q output of this flip flop. The generation of a data present signal at the Q output of flip flop 118 causes the range figure represented by the present count state of the range counter comprised of counters 102, 104, 106 and 108 to be transferred to latches 112 and 114 for temporary retention.

The signal at the Q output of flip flop 118 also provides an indication to microprocessor 100 that there is data in these latches which needs to be stored in RAMS 120 and 122. The data present signal is provided to the $\overline{INT}$ input of microprocessor 100. Upon receipt of a data present signal at this input, microprocessor 100 causes the range figure presently stored in latches 112 and 114 to be stored in RAMS 120 and 122 in a unique manner. In particular, microprocessor 100 provides T bits of the memory address at outputs $DO-D_6$, a disable code at outputs $P_{20}-P_{23}$, and a write signal at output $\overline{WR}$. The disable code is provided to port expander 134 which responds to it by causing bidirectional port 132 to be disabled. Port expander 134 also provides 3 bits of the memory address at outputs $P_{70}-P_{72}$. The remaining 7 bits of the memory address are provided through latch 133 to RAMS 120 and 122. The memory address is used by RAMS 120 and 122 to store the incoming data at the memory location designated by this memory address. The write signal, on the other hand, is provided to RAMS 120 and 122 and latches 112 and 114 to initiate a transfer of the range figure stored in the latches to the proper memory location of RAMS 120 and 122. By disabling bi-directional port 132, a write instruction from the microprocessor is used to initiate the storage of external data rather than internal data from the microprocessor. Use of this storage technique speeds up the storage operation to insure that none of the decoded video pulses are missed.

Following storage of the range figure, flip flop 118 is reset, thereby placing it in condition to search for the next decoded video pulse. Upon receipt of the next decoded video pulse, flip flop 118 is once again set and thereby initiates the storage process described above. The DME operates in this manner until the range counter comprised of counters 102, 104, 106 and 108 reaches its maximum count state. When the range counter reaches its maximum count state, flip flop 110 is reset. Resetting of flip flop 110 causes an overrange signal to be provided to the TO input of microprocessor 100. This signal indicates to the microprocessor that the maximum range figure has been obtained and that no further range data will be forthcoming. Thereafter, the microprocessor can initiate another interrogation cycle.

Figure 4A:
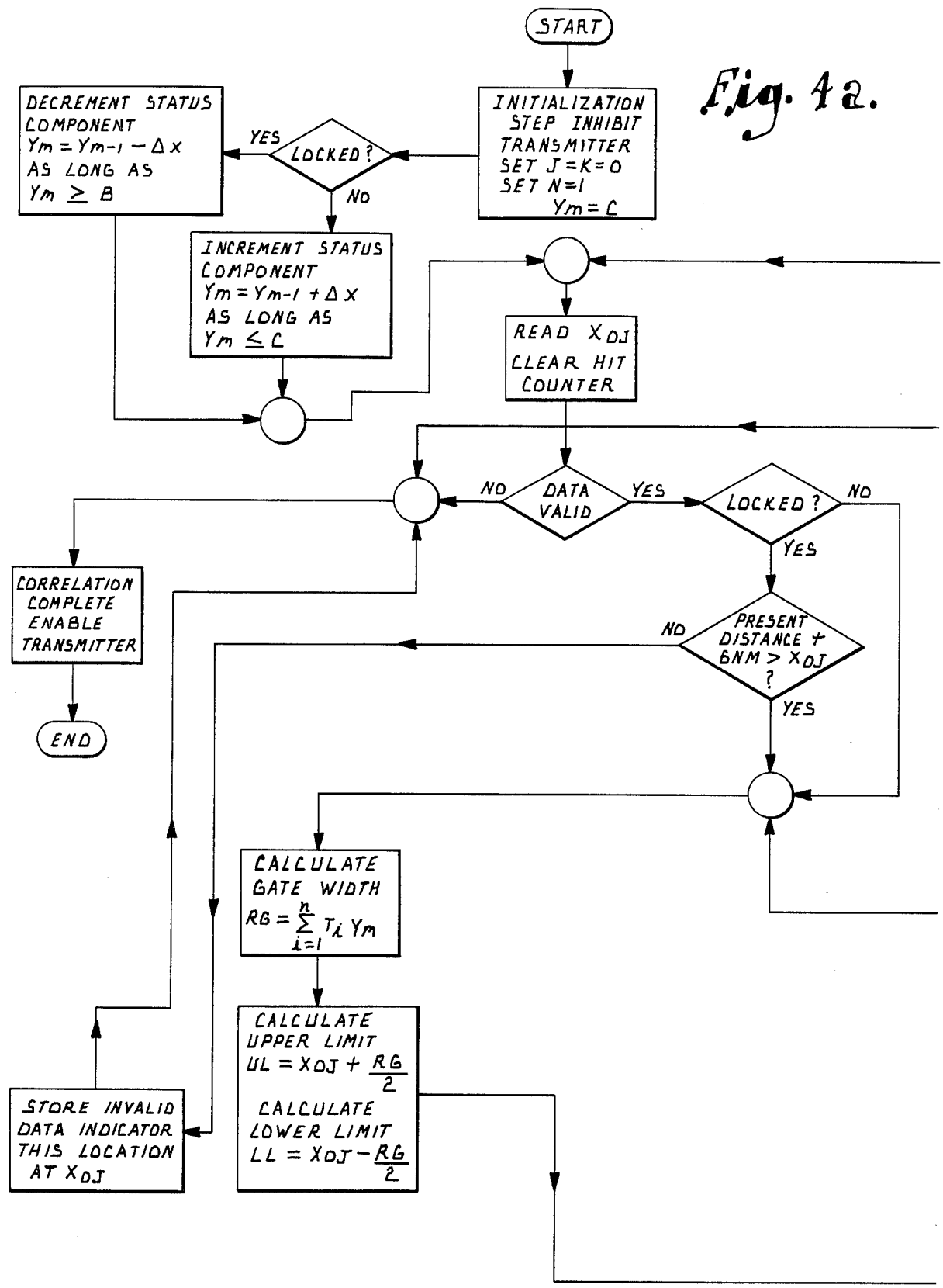
FIGS. 4a and 4b together provide a flow chart for the correlation routine performed by the microprocessor of the DME.
Figure 4B:
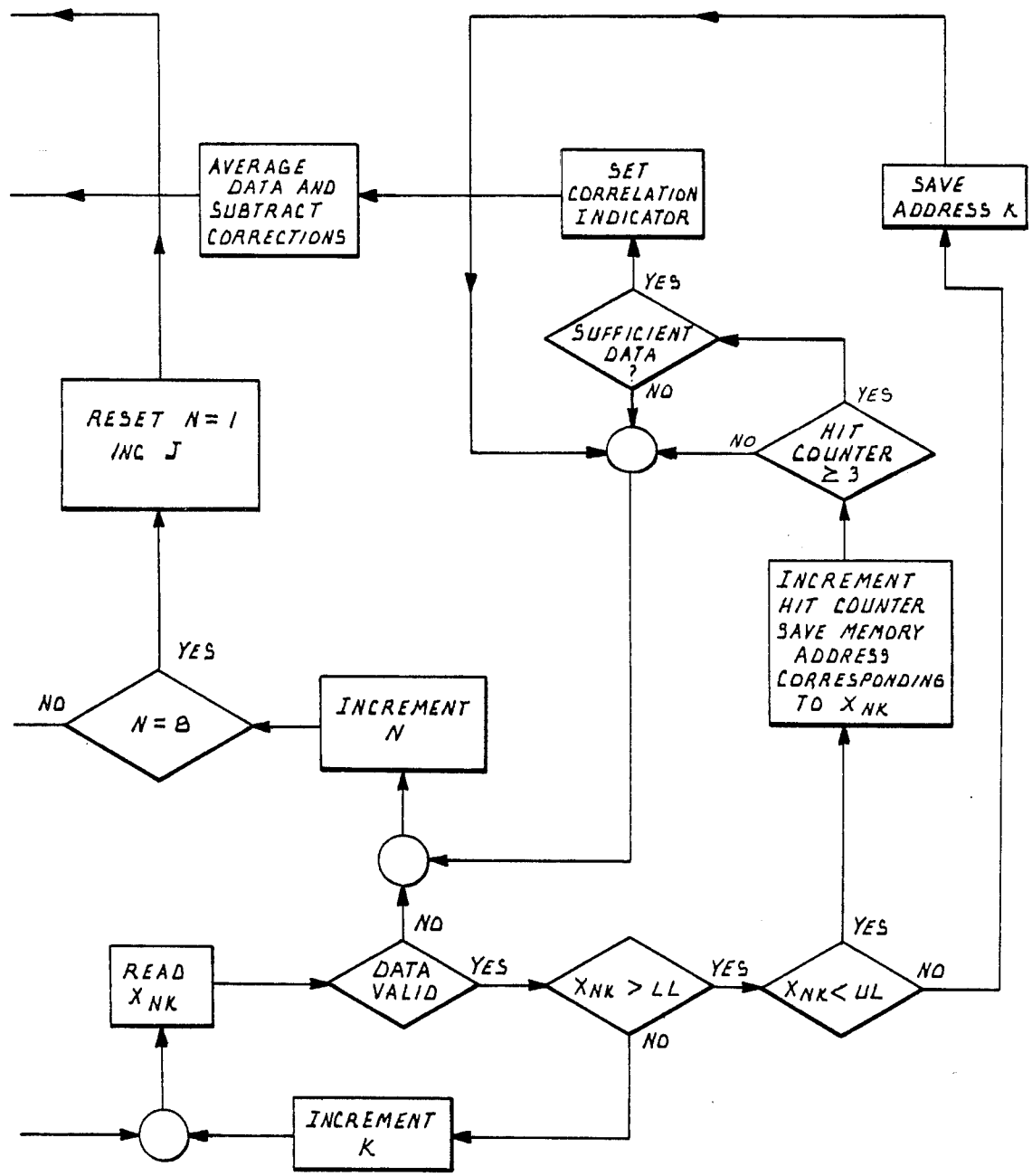

Once three interrogation cycles have been completed, the accumulated range data is processed to lock the DME onto the designated ground station transponder and to produce a desired distance output. Processing of the accumulated range data is performed by a correlation routine which is defined by the flow chart shown in FIGS. 4a and 4b. As shown in FIGS. 4a and 4b, microprocessor 100 initiates the correlation routine by performing an initialization step wherein the unit's transmitter is inhibited, the status component of the range gate value is set to its maximum value C, the data designation constants J and K are set equal to O and the interrogation designation N is set equal to 1.

Upon completion of the initialization step, the status component of the range gate valve is decreased by an incremental amount to a minimum value if the unit is locked to a ground station or increased by an incremental amount to a maximum value if the unit is not locked to a ground station. In particular, the present value of the status component $Y_M$ is calculated by decreasing the previous value by an incremental amount $\Delta X$ if the unit is locked. In no case, however, can the value of the status component be decreased below the minimum value B. If the unit is not locked onto the desired ground station, the status component $Y_M$ of the range gate value is increased by the incremental amount $\Delta X$. In no case, however, can the value of the status component $Y_M$ increase above a maximum value C.

As noted above, the width of the status component was initially set to its maximum value C during the initialization step. Accordingly, the status component $Y_M$ of the range gate value remains at its maximum value until the system is locked onto the designated ground station.

Once the status component has been calculated, the microprocessor reads the range figure identified by the character $X_{OJ}$ and clears the hit counter. As noted above, the range figure identified by the character $X_{OJ}$ represents the J range figure of the O or latest interrogation cycle. Since the data designation constant J was set to 0 during the initialization step, character $X_{OJ}$ initially designates the first range figure obtained during the latest interrogation. Microprocessor 100 reads this figure by generating an enable code on outputs $P_{20}$-$P_{23}$, a read signal on output $\overline{RD}$ and 7 bits of the memory address designating the storage location within the RAM where this figure is stored on outputs $D_0$-$D_6$. The enable code is provided to port expander 134 which responds to this code by placing bi-directional port 132 in an enabled conditioned thereby allowing the range data stored within RAMS 122 and 124 to be transmitted to microprocessor 100. Port expander 134 also provides 3 bits of the memory address of outputs $P_{70}$-$P_{72}$.

Once the range figure represented by the character $X_{OJ}$ has been read, the data retrieved is examined to determined if it is valid. In particular, microprocessor 100 examines the data to determine if it is comprised of all zeros. If the retrieved data is comprised of all zeros, the microprocessor assumes that it is invalid and terminates the correlation routine by enabling the unit's transmitter and exiting the routine. If, on the other hand, the retrieved data is not comprised of all zeros, the microprocessor assumes that the data is valid and performs a check to see if the unit is locked onto a corresponding ground station.

If the unit is locked to a ground station, a preselected value is added to the present distance to the ground station. The resulting figure is then checked to see if it is greater than the range figure $X_{OJ}$ from the latest interrogation. If the resulting figure is not greater than the range figure $X_{OJ}$ the range figure $X_{OJ}$ of the latest interrogation is assumed to be invalid. The microprocessor then places an invalid data indicator comprised of all zeros in the memory location corresponding to range figure $X_{OJ}$ and terminates the correlation routine as described above. If the resulting figure is greater than $X_{OJ}$, the range gate width is then calculated $X_{NK}$, the Kth range figure of the Nth previous interrogation cycle, is then read and examined to determine if it is valid.

The width of the range gate is computed by multiplying the value of the status component $Y_M$ by the time component of the range gate figure. The time component $(T_M)$ of the range figure for the Nth revious interrogation is defined by the equation:

$$T_M = \sum_{i=1}^{N} t_i$$

where $t_i$ is equal to the time between i and i-1 interrogations. In this way, the range gate is made to have a width corresponding to the interrogation cycle from which range data is being compared with the range figure of the latest interrogation. Thereafter, the range gate value is used to calculate acceptable upper and lower limits. The acceptable upper limit is obtained by simply adding one-half of the previously computed range gate value to the present range figure. This operation is mathematically defined by the equation:

$$UL = X_{OJ} + (RG/2)$$

The lower limit LL, on the other hand, is obtained by substracting one-half of the previously calculated value of the range gate from the present range figure $X_{OJ}$. This operation is mathematically defined by the equation:

$$LL = X_{OJ} - (RG/2)$$

In this way, a range gate having an appropriate width is centered about the present range figure $X_{OJ}$.

If the range figure $X_{NK}$ is not valid (i.e. is comprised of all zeros), the data designation constant N is incremented and examined to determine if it is equal to the number 8. The data designation constant N will be less than 8 if there is range data from additional interrogation cycles which needs to be compared with the present range figure from the $X_{OJ}$. Accordingly, microprocessor 100 responds to a data designation constant of less than 8 by computing the range gate corresponding to the new value of N, establishing an upper and lower limit based on the new range gate value and retrieving and examining the first range figure of the Nth interrogation cycle as described above.

The data designation constant N will be equal to the number 8 when the data from all seven of the previous interrogation cycles have been compared with range figure $X_{OJ}$. In this case, microprocessor 100 causes the data designation constant N to be reset to one and the data designation constant J to be incremented before reading the next range figure of the latest interrogation cycle and examining this range figure as previously described herein.

If, on the other hand, the range figure $X_{NK}$ is valid, this figure is simply compared against the lower limit LL. If th range figure $X_{NK}$ is not greater than the lower limit, the data designation constant K is incremented and the range figure corresponding to the new range address $X_{NK}$ is read and validated. The microprocessor remains in this comparison loop until the range figure obtained is either invalid or greater than the lower limit LL. If the data is invalid, the data designation constant N is incremented and examined as described above.

Microprocessor 100 responds to a range figure $X_{NK}$ greater than the lower limit by comparing this range figure against the upper limit. If the range figure $X_{NK}$ is not less than the upper limit, microprocessor 100 retains the data designation constant K at its present value, increments the data designation constant N, and examines it as described above. If the range figure $X_{NK}$ is less than the upper limit, the range figure $X_{NK}$ falls within the range gate centered about the range figure $X_{OJ}$. Microprocessor 100 responds to this condition by incrementing the hit counter, and saving the memory address corresponding to range figure $X_{NK}$.

Thereafter, the microprocessor 100 examines the hit counter to determine if it is greater than or equal to 3. If the hit counter is not greater than or equal to 3, microprocessor 100 increments the data designation constant N and either begins a comparison of the range figures of the Nth interrogation cycle to the present range figure $X_{OJ}$ or calls up the next range figure of the latest interrogation and begins a comparison thereof depending upon whether or not the data designation constant N is equal to 8 after it has been incremented. If, on the other hand, the range counter is equal to or greater than 3, microprocessor 100 executes the sufficiency routine shown in FIG. 5.

Figure 5:
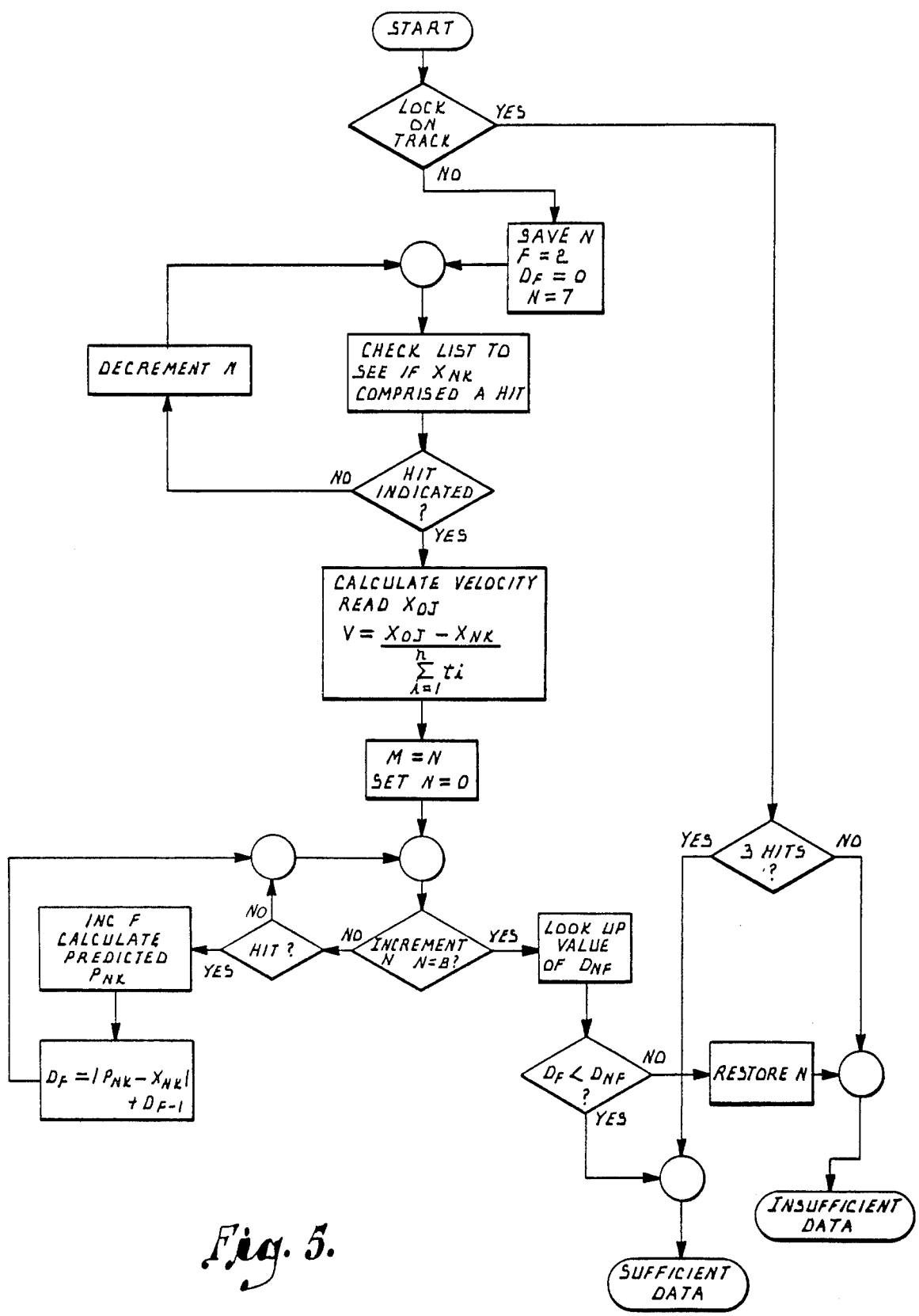
FIG. 5 is a flow chart for the sufficiency routine which is performed by the DME.

Turning now to FIG. 5, microprocessor 100 initiates the sufficiency routine by checking to see if the unit is in a locked condition. If the unit is in a locked condition, microprocessor 100 checks the hit counter to see if it is greater than or equal to 3. Microprocessor 100 then exits the sufficiency routine providing a sufficient data indication if the hit counter is greater than or equal to 3 or exits the sufficiency routine providing an insufficient data indication if the hit counter if not greater than or equal to 3.

If the unit is not in a locked condition, microprocessor 100 sets and initializes several variables for use in the data sufficiency program. In particular, microprocessor 100 stores the current value of the data designation constant N and resets the value of the data designation constant N equal to 7 for use in executing the sufficiency routine. In addition, microprocessor 100 establishes two new variables designated by the characters F and $D_F$ and sets these variables to 2 and 0, respectively.

Microprocessor 100 then runs through a hit locating loop. This loop comprises the steps of checking through the list of range figures which comprises hits (i.e. the range figures which fell within the range gate) to determine if the range figure $X_{NK}$ where N is initially equal to 7 comprised a synchronous reply. If this range figure was not a synchronous reply, microprocessor 100 decrements the data designation character N and examines the range figure corresponding to the new value of N to determine if it was a synchronous reply. Microprocessor 100 continues to search through the range figures in this manner until a range figure comprising a synchronous reply is located.

Thereafter, microprocessor 100 calculates the velocity of the aircraft by calling up the range figure $X_{OJ}$, subtracting the range figure $X_{NK}$ found to be a synchronous reply during the previous operation and dividing the difference between these two range figures by the time period between the two interrogation cycles from which these range figures were obtained. Microprocessor 100 then sets a new variable designated by the letter M equal to the present value of N (this value of N was obtained in the previous operation wherein the interrogation cycle represented by the letter N in which a synchronous reply was received was identified) and resets the data designation constant N to 0.

Microprocessor 100 then performs the deviation analysis by computing the deviation between a distance figure calculated using the previously computed velocity and the actual distance represented by a synchronous range figure of an interrogation cycle falling between the latest interrogation cycle and the oldest available interrogation cycle in which a synchronous reply was received. This operation is performed by first incrementing the data designation constant N and comparing it with the variable M to see if the incremented value of N is equal to M.

If the incremented value of N is not equal to M, the range figure $X_{NK}$ identified by the incremented value of N is examined to determine if it is a synchronous reply, i.e., previously designated a hit. If the range figure $X_{NK}$ identified by the incremented value N is not a synchronous reply, the value of N is incremented and once again compared with the variable M to determine if they are equal. The microprocessor continues to search through the range figure of each interrogation cycle in this manner until a hit or synchronous reply is located. It is reasonable to assume that microprocessor 100 will locate such a synchronous reply since at least three synchronous replies were required to initiate execution of the sufficiency routine.

Once a synchronous reply of an interrogation cycle falling between the latest interrogation cycle and the oldest available interrogation cycle in which a synchronous reply was received is located, microprocessor 100 increments the variable F and calculates the distance figure for the present value of N, using the equation $$P_{NK} = X_{OJ} - V \sum_{i=1}^{N} t_i$$

where $P_{NK}$ is the predicted distance for the value of N, $X_{OJ}$ is the range figure from the latest interrogation, V is the previously computed velocity and ti is the time between successive interrogation cycles.

Microprocessor 100 then computes the aggregate deviation $D_F$ by taking the difference between the calculated distance figure $P_{NK}$ and the distance represented by the range figure $X_{NK}$ and adding the value thus obtained to the previously computed aggregate deviation. The aggregate deviation thus obtained is then retained for future reference. In this way, microprocessor 100 is capable of obtaining an aggregate deviation which is representative of the deviation between the calculated distance and the actual distance for each synchronous reply occurring within an interrogation cycle falling between the latest interrogation cycle and the oldest available interrogation cycle in which a synchronous reply was received.

Microprocessor 100 continues to search for synchronous replies and to compute an aggregate deviation corresponding to each such synchronous reply until all of the interrogation cycles falling between the latest interrogation cycle and the oldest available interrogation cycle in which a synchronous reply occurred have been reviewed. At this time, N will be equal to M and microprocessor will exit the review and deviation computation loop described above.

Microprocessor 100 then looks up the previously computed statistical deviation $D_{NF}$ conforming to the present value of F. As discussed above, F is incremented each time a synchronous range figure is located within the deviation computational loop. In particular, F is equal to the number 3 if the aggregate deviation is comprised of a single deviation, to the number 4 if the aggregate deviation is comprised of two deviations and so on. The statistical deviation for each value of F is statistically computed and stored within the unit. The statistical deviation represents the probability of a false lock-on occurring during the number of synchronous replies. In particular, the probability of a noise or squitter pulse meeting a set deviation for a set number of replies can be calculated. In this manner, a deviation for a noise or squitter lock is found for any number of replies varying from three through eight. Each of these deviations is in turn stored within the DME unit for use in the statistical analysis of the synchronous replies.

Microprocessor 100 then compares the aggregate deviation with th statistical deviation called up from memory. If the aggregate deviation is greater than or equal to the statistical deviation, microprocessor 100 exits the sufficiency routine providing a data sufficient indication. If the aggregate deviation is less than the statistical deviation, on the other hand, microprocessor 100 restores N to its previous value and exits the sufficiency routine providing an insufficient data indication.

Microprocessor 100 then returns to the correlation routine of FIGS. 4a and 4b. As shown in FIGS. 4a and 4b, microprocessor 100 increments the value of N and then continues on with the correlation process if the analysis performed by the sufficiency routine indicated that the synchronous replies represented insufficient data. If, on the other hand, microprocessor 100 exited the sufficiency routine with a sufficient data indication, microprocessor 100 sets the correlation indicator to provide an indication that the unit has locked onto the corresponding ground station transponder. Microprocessor 100 then averages all of the validated range figures and performs a correction on the resulting vaue to provide an accurate output representative of the distance between the aircraft and the ground station transponder. Thereafter, microprocessor 100 terminates the correlation routine by enabling the unit's transmitter and exiting the correlation routine.

Upon completion of the correlation routine, microprocessor 100 causes another pair of interrogation pulses to be transmitted. Thereafter, microprocessor 100 processes the accumulated range data associated with this interrogation cycle by executing the correlation routine as described above.

From the foregoing, it will be seen that this invention is one well adapted to attain all the ends and objects herein set forth together with other advantages which are obvious and which are inherent to the structure.

It will be understood that certain features and subcombinations are of utility and may be employed without reference to other features and subcombinations. As many possible embodiments may be made of the invention without departing from the scope thereof, it is to be understood that all matter herein set forth are shown in the accompanying drawings is to be interpreted and illustrated and not in a limiting sense.

Having thus described the invention, I claim:

1. In a DME of the type adapted to repeatedly transmit interrogation pulse pairs wherein the time interval between the transmission of an interrogation pulse pair is referred to as an interrogation cycle and to receive and decode reply pulses by generating a decoded video pulse each time a pair of reply pulses exhibiting a preselected spacing are received, said reply pulses either being valid replies in response to said transmitted interrogation pulses or invalid replies which originate in response to other interrogations from other DME units or squitter reply pulses, the improvement comprising:
   means for producing a range figure corresponding to all decoded video pulses which are generated during a set time period of each interrogation cycle irrespective of the presence or absence of decoded pulses of a preselected number of previous interrogation cycles, each of said range figures being representative of the interval of time between transmission of the interrogation pulse pair which initiated the interrogation cycle and generation of its associated video pulse;
   means for storing all of said range figures; and
   processing means for processing and analyzing all of said range figures to determine which of said range figures represent valid replies.

2. The improvement set forth in claim 1 wherein said processing means is comprised of
   means for comparing all of the range figures of the latest interrogation cycle with the range figures of a preselected number of prior interrogation cycles to determine which of these range figures are within a desired range gate of each other and for statistically examining all of the range figures which are within the desired range gate of each other to determine which of them represent valid replies.

3. The improvement set forth in claim 1 wherein said processing means is comprised of means for comparing at least one range figure of the latest interrogation cycle with at least one range figure of a preselected number of prior interrogation cycles to determine which of the range figures from the previous number of interrogation cycles are representative of a time interval which is within a set period of time of a time interval represented by a range figure of the latest interrogation and for statistically examining the range figures which are within said set period of time to determine which of them represent valid replies.

4. The improvement set forth in claim 2 wherein said processing means varies the width of the range gate in accordance with which interrogation cycle is associated with a range figure being compared with a range figure of the latest interrogation.

5. The improvement set forth in claim 4 wherein said processing means also produces a range gate of a preselected size for comparison with a range figure of the earliest available interrogation cycle and means for successively decreasing the width of the range gate by a set amount for comparison with a range figure of each of the more recent interrogation cycles.

6. The improvement set forth in claim 4 wherein said processing means indicates whether the DME is presently locked onto a designated ground station transponder.

7. The improvement set forth in claim 6 wherein said processing means varies the width of the range gate dependent upon whether the unit is locked onto a designated ground station transponder or not.

8. The improvement set forth in claim 2 wherein said processing means uses a range figure from the latest interrogation and a first range figure from one of the preselected number of prior interrogation cycles which are within the range gate of each other to calculate a velocity figure;

and uses said velocity figure to calculate a distance corresponding to a second range figure from at least one other interrogation cycle wherein said second range figure and said range figure from the latest interrogation are within the range gate of each other;

and measures the difference between the calculated distance and the distance represented by said second range figure;

and compares the measured difference against a preselected difference; and provides a sufficient data indication if the measured difference is less than the preselected difference.

9. The improvement set forth in claim 8 wherein said processing means places the unit in a locked condition if a sufficient data indication is present.

10. In a DME of the type adapted to repeatedly transmit interrogation pulse pairs wherein the time interval between transmission of interrogation pulse pairs is referred to as an interrogation cycle and to receive and decode reply pulses by generating a decoded video pulse each time a pair of reply pulses exhibiting a preselected spacing are received, said reply pulses either being valid replies in response to said transmitted interrogation pulses or invalid replies which originate in response to other interrogations from other DME units or squitter reply pulses, the improvement comprising:

means for producing a range figure corresponding to all decoded video pulses which are generated during a set time period of each interrogation cycle irrespective of said decoded pulses of a preselected number of previous interrogation cycles, each of said range figures being representative of the interval of time between transmission of the interrogation pulse pair which initiated the interrogation cycle and generation of its associated video pulse;

processing means for comparing at least one range figure from the most recent interrogation cycle with at least one range figure from a preselected number of previous interrogation cycles to determine which of these range figures represent time intervals which are within a set time period of each other;

and for varying the acceptable time period between range figures in accordance with which of the interrogation cycles the range figure presently being compared with a range figure of the latest interrogation originates; and for statistically examining the range figures which are within the acceptable time period of each other to determine which of them represent valid replies.

11. The improvement set forth in claim 10 wherein said processing means uses a range figure from the most recent interrogation cycle and a first range figure from one of the preselected number of previous interrogation cycles which are within the range gate of each other to calculate a velocity figure; and uses said velocity figure to calculate a distance corresponding to a second range figure from at least one other interrogation cycle wherein said second range figure and said range figure from the most recent interrogation are within the range gate of each other; and measures the difference between the calculated distance and the distance represented by said second range figure; and compares the measured difference against a preselected difference; and provides a sufficient data indication if the measured difference is less than the preselected difference.

12. The improvement set forth in claim 11 wherein said processing means places the DME in a locked condition if a sufficient data indication is present.

13. In a DME of the type adapted to repeatedly transmit interrogation pulse pairs wherein the time interval between the transmission of interrogation pulse pairs is referred to as an interrogation cycle and to receive and decode reply pulses by generating a decoded video pulse each time a pair of reply pulses exhibiting a preselected spacing are received, said reply pulses either being valid replies in response to said transmitted interrogation pulses or invalid replies which originate in response to other interrogations from other DME units or squitter reply pulses, a method for separating valid from invalid replies, said method comprising the steps of producing a range figure corresponding to all decoded video pulses which are generated during a set time period of each interrogation cycle irrespective of said decoded pulses of a preselected number of previous interrogation cycles, each of said range figures being representative of the interval of time between transmission of the interrogation pulse pair which initiated the interrogation cycle and generation of its associated decoded video pulse, storing all of said range figures, and processing and analyzing all of said range figures to determine which of said range figures represent valid replies.

14. The method as in claim 13 wherein said processing and analyzing step comprises the steps of comparing at least one of the range figures of the latest interrogation cycle with at least one range figure of a preselected number of prior interrogation cycles to determine which of these range figures are within a desired range gate of each other, and statistically examining all of the range figures which are within the desired range gate of each other to determine which of them represent valid replies.

15. The method as in claim 14 including the step of varying the width of the range gate in accordance with which interrogation cycle a range figure being compared with a range figure of the latest interrogation cycle originates.

16. The method as in claim 14 wherein said statistical examination step comprises the steps of using a range figure from the latest interrogation signal and a first range figure from one of the preselected number of prior interrogations which are within the range gate of each other to calculate a velocity figure, using said velocity figure to calculate a distance corresponding to a second range figure from at least one of the other interrogation cycles which is within the range gate of the range figure from the latest interrogation, and computing the difference between the actual distance corresponding to said second range figure and the calculated distance corresponding to said second range figure.

17. The method as in claim 16 including the step of placing the DME unit in a locked condition if a sufficient data indication is present.

* * * * *